United States Patent
Glock

(10) Patent No.: US 11,260,332 B2
(45) Date of Patent: Mar. 1, 2022

(54) PRODUCT GAS FILTER

(71) Applicant: Glock Health, Science and Research GmbH, Deutsch Wagram (AT)

(72) Inventor: Gaston Glock, Velden (AT)

(73) Assignee: Glock Health, Science and Research GmbH, Deutsch Wagram (AT)

( * ) Notice: Subject to any disclaimer, the term of this patent is extended or adjusted under 35 U.S.C. 154(b) by 379 days.

(21) Appl. No.: 16/461,140

(22) PCT Filed: Nov. 10, 2017

(86) PCT No.: PCT/EP2017/078908
§ 371 (c)(1),
(2) Date: May 15, 2019

(87) PCT Pub. No.: WO2018/091371
PCT Pub. Date: May 24, 2018

(65) Prior Publication Data
US 2019/0366254 A1    Dec. 5, 2019

(30) Foreign Application Priority Data
Nov. 16, 2016   (EP) ..................... 16199125

(51) Int. Cl.
*B01D 53/90* (2006.01)
*B01D 46/24* (2006.01)
(Continued)

(52) U.S. Cl.
CPC ..... *B01D 46/0036* (2013.01); *B01D 46/0068* (2013.01); *B01D 46/2407* (2013.01);
(Continued)

(58) Field of Classification Search
CPC ............... B01D 46/00; B01D 46/0036; B01D 46/0068; B01D 46/2407; B01D 46/444;
(Continued)

(56) References Cited

U.S. PATENT DOCUMENTS 2,975,000 A * 3/1961 Davis, Jr. ............... B65G 53/00
                                                            406/136
5,346,533 A * 9/1994 Jelich ................. B01D 46/0068
                                                            55/283
(Continued)

FOREIGN PATENT DOCUMENTS

EP        1870444 A2   12/2007
EP        3067407 A1    3/2015
(Continued)

OTHER PUBLICATIONS

JP2001058117A_ENG (Espacenet machine translation of Fujimoto) (Year: 2001).*
(Continued)

*Primary Examiner* — Jonathan Miller
*Assistant Examiner* — Gabriel E Gitman
(74) *Attorney, Agent, or Firm* — Raven Patents, LLC; Anton E. Skaugset

(57) ABSTRACT

A product gas filter with a filter housing, into which product gas of a wood gas reactor is supplied, by means of a product gas line, and is discharged as clean gas through a clean gas line. Long-chain hydrocarbons in the product gas stream can be at least substantially reduced, and a high filter performance achieved, where the filter is divided gas-tight into two parts by a separating tray in such a way that the product gas line is delivered to the lower region and the clean gas line exits from the upper collecting space; at least two filter cartridges, each coupled individually to a compressed air line and compressed air source, project into the lower region; and a zeolite container is connected to the lower portion of the filter via a compressed air source connectable, Venturi nozzle and a lockable line.

14 Claims, 1 Drawing Sheet

(51) Int. Cl.
*B01D 46/00* (2006.01)
*B01D 46/44* (2006.01)
*B01D 53/86* (2006.01)

(52) U.S. Cl.
CPC ........ *B01D 46/446* (2013.01); *B01D 53/8696* (2013.01); *B01D 53/90* (2013.01); *B01D 2257/702* (2013.01); *B01D 2273/20* (2013.01); *B01D 2279/00* (2013.01)

(58) Field of Classification Search
CPC .............. B01D 46/446; B01D 2279/00; B01D 2273/20; B01D 53/04; B01D 53/10; B01D 53/72; B01D 53/74; B01D 53/83; B01D 53/8696; B01D 53/90; B01D 2257/702; B01D 27/14; B01D 37/04; B01D 46/0057; B01D 46/0067; B01D 46/0069; B01D 46/0071; B01D 46/0083; B01D 53/86; B01D 53/869; Y02E 50/10; C10K 1/024; C10K 1/34; C10K 1/02; C10B 53/02; C10J 3/84
See application file for complete search history.

(56) References Cited

U.S. PATENT DOCUMENTS

| | | | |
|---|---|---|---|
| 5,505,766 A | 4/1996 | Chang | |
| 5,636,240 A * | 6/1997 | Tsai | B01D 53/501 373/27 |
| 6,863,868 B1 * | 3/2005 | Alvin | B01D 39/2027 422/168 |
| 2004/0261376 A1 * | 12/2004 | Morgan | B01D 46/523 55/302 |
| 2012/0275976 A1 * | 11/2012 | Nicholson | B01D 53/83 423/210 |
| 2013/0276628 A1 * | 10/2013 | Chalabi | B01D 46/0068 95/9 |
| 2015/0336041 A1 * | 11/2015 | Hatfield | B01D 46/0023 55/488 |

FOREIGN PATENT DOCUMENTS

| | | | | |
|---|---|---|---|---|
| JP | 2001058117 A * | 3/2001 | | B01D 46/02 |
| JP | 200528294 A | 2/2005 | | |
| JP | 2005028294 A * | 2/2005 | | B01D 46/02 |
| JP | 2007238670 A * | 9/2007 | | B01D 46/00 |
| WO | 2008089503 A1 | 7/2008 | | |
| WO | 2010034791 A1 | 4/2010 | | |

OTHER PUBLICATIONS

JP2007238670A_ENG (Espacenet machine translation of Omura) (Year: 2007).*
JP2005028294A_ENG (Espacenet machine translation of Ono) (Year: 2005).*
European Patent Office, "International Search Report" in connection with related International Application No. PCT/EP2017/078908, dated Apr. 4, 2018, 6 pgs.

* cited by examiner

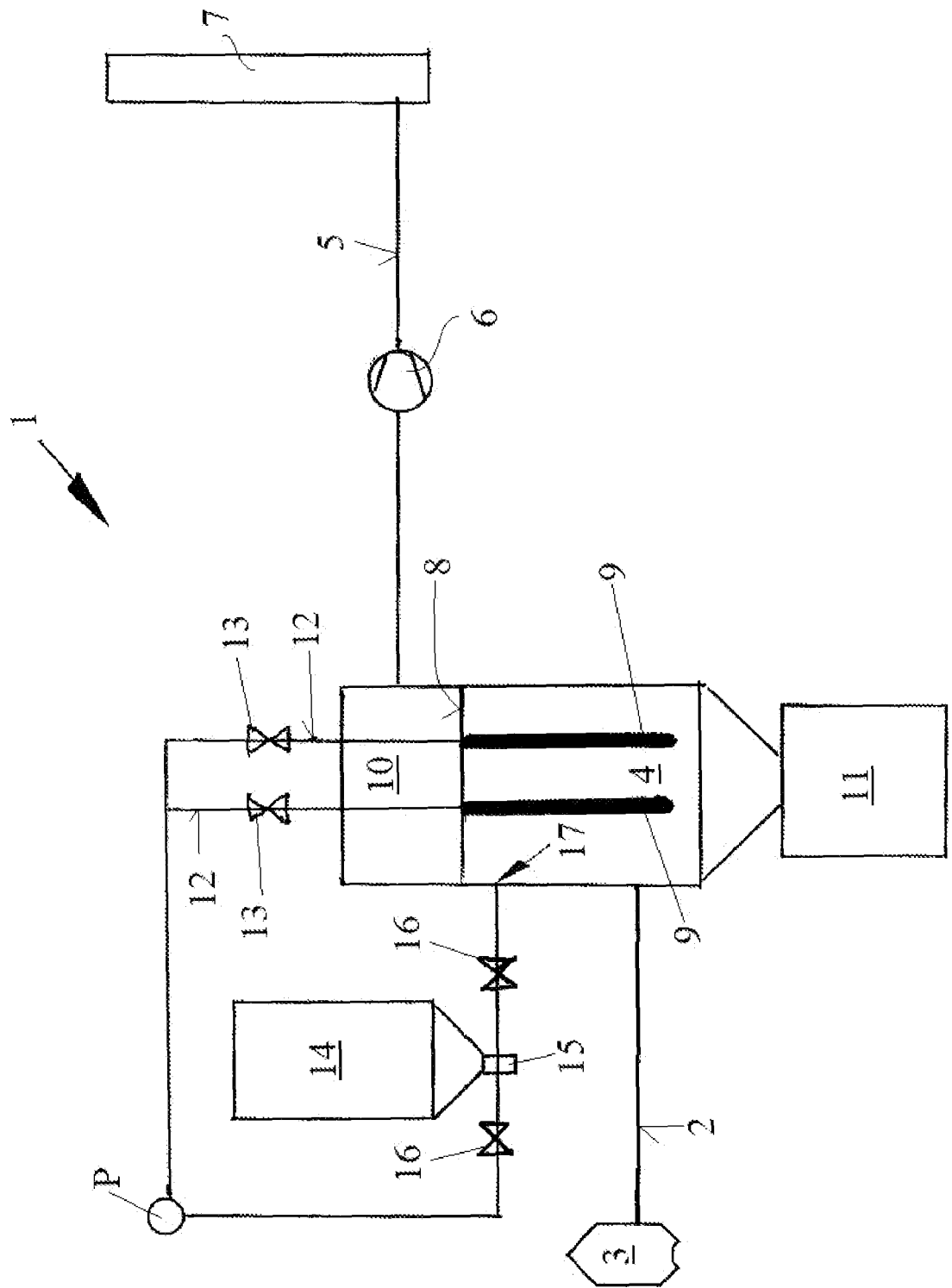

PRODUCT GAS FILTER

TECHNICAL FIELD

The invention relates to a device for reducing long-chain hydrocarbons in the product gas of wood gas reactors according to the preamble of claim 1 and EP 3 067 407; in other words, a product gas filter having a housing to which product gas from a wood gas reactor is supplied by means of a product gas line.

BACKGROUND

It is known from EP 3 067 407 of the Applicant, that with such a system in the product gas filter but before the actual filter, oxygen is supplied to the product gas in order to improve the yield.

This document does not deal with the problem of the reduction of long-chain hydrocarbons. EP 1 870 444 and WO 2008/089503 relate to similar devices which, however, likewise do not deal with the problem of reducing long-chain hydrocarbons.

Those hydrocarbons typically occurring in biomass gasification, as long-chain hydrocarbons, for example, such as: phenol, acenaphthylene, naphthalene, methylnaphthalene, phenanthrene, cresol, biphenyl, fluorides and anthracene. In wood gasification, their formation is effected by the ever present terpenes and also the lignin. Reactors are all known in the state of the art, thus in particular those with increasing gasification, with decreasing gasification, with 2-stage gasification, with stationary fluidized bed and also with circulating fluidized bed.

Wood gas reactors in the context of the invention produce product gas from a biomass, which can be used in a variety of ways, for example in a block power plant, in a turbine and the like.

It is necessary to separate solids contained in the product gas. Such solids are in gas reactors mostly unburned carbon particles, but may be included in small amounts and other admixtures. Here, both the respective legislator and the operators are increasingly urging the removal of so-called fine dust, and such, ever stricter limits are prescribed. One way to separate these solids consists in a classic filtering, with a variety of filters which can be used, filter cartridges and filter bags should only be referred to.

An alternative technology for filtering is the use of a catalyst in which these solid particles are catalytically burned, as far as this is chemically possible.

Both methods had their advantages and disadvantages. In addition, lawmakers in various countries not only demand increasingly better filtering of product gases and flue gases in general, but also, as a novelty, demand that the levels of long-chain hydrocarbons remaining in the product gas are reduced.

In order to reduce long-chain hydrocarbons from biomass gasification, the focus is currently placed on the fuel used and its bulkiness. Occasionally, the moisture content of the fuel also plays a role. In addition, such components may be added to the gassing downstream aggregates, e.g. engines, damage as they condense and tend to stick. It is the object of the invention to provide such a device or method, which is able to meet the requirements of the future and thus is in particular able to remove long-chain hydrocarbons from the product gas at least largely and preferred to filter out the fine and fine dust in one.

SUMMARY

According to the invention, these objects are achieved by applying finely ground zeolite is to a filter or a filter cake to be traversed by the product gas stream, by which in particular long-chain hydrocarbons are catalytically cracked over the zeolite filter cake and can be discharged with it from the product gas stream.

In a preferred embodiment, a product gas filter according to the invention has at least two filter cartridges through which the product gas flows, and on the surface of which the particles are filtered out, resulting in the construction of a filter cake, as known in such filters, such that when the pressure drop of the flowing product gas stream exceeds a predetermined limit, the filter cake is separated and discharged from the filter.

According to the invention, finely ground zeolite in the area of the filter candle(s) is blown into the product gas stream after removal of the filter cake, forms the basis of the filter cake on the filter candle and thus forms a layer or a shell, albeit extremely thin, that is capable of reducing the long-chain hydrocarbons contained in the product gas stream. With the next blowing off or blasting off of the filter cake, the spent catalytically active zeolite is discharged with the spent filter cake. Zeolite has been used in the state of the art for the separation of mercury from flue gas of fossil origin, as mentioned in U.S. Pat. No. 5,505,766 in a subordinate clause.

Zeolite is also addressed in the prior art in another context, namely the treatment of exhaust gas, flue gas and combustion gas, as disclosed for example in JP 2005 028 294 or WO 2010/034791:

In this case, the Japanese document relates to extremely acidic waste gases, which are mixed with a treatment agent containing at least 50 wt.-% alkaline medium, for filtering fine dust, the filter can be provided with a deliberately applied filter cake, in an enumeration therefor suitable materials also zeolite is mentioned.

Even if there are long-chain hydrocarbons in these exhaust gases—it is not mentioned—they are not directly reduced under the thermal and chemical conditions in the filter housing and on the filter. The WO document deals with exhaust gases that are produced during the production of pig iron or coal gasification plants and therefore, in contrast to the invention, which relates to the gasification of wood, are burdened with the most unpleasant contaminants.

Here, in addition to a mechanical filtration, the addition of a particulate additive is proposed, which may also contain an adsorbent, which in turn may be finely ground zeolite. The loaded adsorbent is subsequently removed from the gas stream in a fine filter. Neither the existence of long-chain hydrocarbons nor an influence on them is mentioned. The invention is explained in more detail below with reference to a purely schematic representation, with a single FIGURE.

BRIEF DESCRIPTION OF THE DRAWING

The single FIGURE represents, purely schematically, an inventive device 1 for product gas filtration.

DETAILED DESCRIPTION

As in technical jargon, the totality of the filter with all enclosures, fittings, etc. and the filter itself are often synonymously called "product gas filters" or "filters" for short, since the respective meaning can be unambiguously deduced from the context. The device 1 is supplied with a product gas stream, which leads through pipes 2 of a wood-gas reactor 3 (only indicated) to the actual filter 4, respectively. From the filter 4, a clean gas line 5, in which a blower 6 is arranged, leads to a gas conversion machine in the form of a turbine, an internal combustion engine, etc. The filter 4 consists essentially of a housing and a separating tray 8, on which several gas filter cartridges are arranged, in the illustrated embodiment, there two filter cartridges 9 arranged below, projecting towards the uncleaned product gas.

The separating tray 8 and its connection to the filter housing and the filter cartridges 9 is formed so dense that the product gas coming through the product gas line 2 can only get through the filter cartridges 9 into the plenum (collecting space) 10 for the clean gas above the dividing tray 8 and from there can get into the clean gas line 5. The lower portion of the filter 4 is tapered or tapered in another way and leads at its lower end, in the illustrated embodiment without shut-off, in a dust container 11.

As a shut-off, for example, a rotary valve can be provided, even simple valves are possible. The filter cartridges 9 are, as known from the prior state of the art, connected via compressed air lines 12 and are connected selectively via operable shut-off valves 13 to a pressure reservoir P.

The device described so far corresponds entirely to conventional product gas filters whose operation, since it corresponds to that of the prior state of the art, should only be briefly described:

In normal operation (starting operation and emergency operation are not described here) the product gas flows from wood gas reactor 3 through the product gas line 2 in the filter 4, from there through the filter cartridges 9 in the collecting space 10, from there through the clean gas line 5 and the possibly provided or also not provided blower 6 in the gas conversion unit.

In this case, when passing through the surface of the filter cartridges 9 solid material is filtered out of the product gas stream; a filter cake is formed. On the one hand, this filter cake improves the filter properties; on the other hand, the increasing build-up of the filter cake increases the pressure drop across the filter cartridges 9 and thus impairs the flow. If predetermined limits of the pressure drop are achieved, the necessary sensors are described below, the associated shut-off valve 13 of each considered filter candle is opened and there is a short but violent pressure surge against the flow direction of the product gas through the filter cartridge, through which the filter cake is properly blasted off and gets into the dust container 11, according to gravity.

After a short time, usually after only a few milliseconds, the shut-off valve 13 is closed again and it begins to build the next filter cake. In this way, with proper design knowledge of the composition of the product gas and clean gas purity requirements to be maintained, the desired purity, over time, can be achieved despite the filter characteristics that fluctuate over time. In order to better deposit on the one hand even the finest particulate matter fractions and on the other hand, beyond and according to the invention, to reduce long-chain hydrocarbons, a reservoir 14 is provided for zeolite according to the invention.

Whose lower end opens into a venturi nozzle 15, which, with suitably open shut-off valves 16, with compressed air which flows through, coming from a storage vessel P, or a compressor. The compressed air now takes on passing through the venturi nozzle 15 from the reservoir 14 finely ground zeolite and atomized by one or more nozzles 17 into the interior of the filter 4, preferably approximately in the area of the filter cartridges 9. This device is operated in such a way that always after the blowing off of filter cake from one of the filter cartridges 9, the two shut-off valves 16 are opened briefly, so that compressed air flows through the venturi nozzle 15 and thereby takes finely ground zeolite with it.

This is atomized during injection into the interior of the housing of the filter 4 and is preferably transported with the product gas stream (here, the flow resistance due to the lack of filter cake is lower than in the other candles(s)) than the gas stream which is transported to the just cleaned filter cartridge 9, where the filter surface is coated. Thus, it essentially forms the first layer and thus the basis for the upcoming filter cake to be built. When passing through this filter cake and finally the, albeit thin, layer of zeolite, long-chain hydrocarbons are reduced and the spent catalytic zeolite is discharged into the dust container 11 the next time the filter cake is blown off. The exact chemical process of "cracking" the long-chain hydrocarbons is not known, but the analyzes of the product gas before and after the filter show that such a reaction must occur, as their proportion drops drastically without being found in the filter cake.

The invention is not limited to the described and illustrated embodiment, but may be variously modified and adapted.

Thus, in most cases, a separate start program will be provided in order to not bring uncleaned product gases for further use or in the environment at the beginning of the filtering. There are many examples in the state of the art that can be easily combined with this in the knowledge of the invention. Such additional filter can also be switched on a filter cartridge after blowing until a new filter cake is formed. The corresponding features and valves or flaps, etc. are also not shown for reasons of clarity, and because they are not causally linked to the gist of the invention. This also applies to the sensors that monitor the operation, in particular the pressure gauges and the flow meters, which can be closed on the condition of the filter cake. In the case of providing multiple filter cartridges, the inlets for the atomized zeolite are to be increased accordingly; the positions of the individual injection nozzles can be adapted to the respective filter cartridges and may also be activated individually or in groups.

Whether several reservoirs 14 are also provided depends on the individual circumstances and can easily be decided by the person skilled in the state of the art of general gas cleaning with knowledge of the invention and of the application. The materials that can be used are the same as in the prior state of the art, it changes nothing by the invention, so it does not seem necessary to address it here.

The control of the system corresponds according to the invention described above, with the exception of the invention to the operated filter cartridges and zeolite blow, also the prior state of the art, these details can be elucidated by means of simple tests and both control systems are described according to the invention above. The grain size of the zeolite to be injected is in conventional applications a minimum of 15 μm and a maximum of 50 μm.

By modifying the zeolite, the respective product gas composition can be taken into account, by a few experiments with different particle size or particle size distributions, the respective optimum can be found; also depending on the filter cartridges used. The exact specification of the natural or synthetic zeolite used depends on the particular product gas producer and needs no further explanation here. It should also be pointed out that in the description and the claims, information such as "mostly" in the composition of materials over 50 wt.-%, preferably over 80 wt.-% and particularly preferably over 95 wt-% mean; that "lower area" of a reactor, filter, structure, or device, or, more generally, an object, means the lower half and especially the lower quarter of the total height, "lowest area" means the lowest quarter and in particular an even smaller portion; while "middle range" means the middle third of the total height.

All this information has its common meaning in relation to the subject matter considered, applied to its intended position and location. In the description and claims, "substantially" means a deviation of up to 10% of the declared value, if it is physically possible, both downwards and upwards, otherwise only in the sensible direction, for degrees (angle and temperature)±10°; are meant.

| Reference number list: | |
|---|---|
| 1 | Filters, total |
| 2 | Raw gas pipe |
| 3 | Wood Gas Reactor |
| 4 | Actual filter |
| 4.1 | Filter Housing |
| 5 | Clean gas line |
| 6 | Blower |
| 7 | Fireplace |
| 8 | Separating base |
| 9 | Filter candle(s) |
| 10 | Collecting space (plenum) |
| 11 | Dust Container |
| 12 | Compressed air line(s) |
| 13 | Shut-off valve(s) |
| 14 | Reservoir |
| 15 | Venturi nozzle |
| 16 | Shut-off valve(s) |
| 17 | Nozzle(s) |

What is claimed:

1. A product gas filter, comprising:
a filter housing to which a product gas from a wood gas reactor is supplied by means of a product gas line and from which a clean gas is discharged through a clean gas line; wherein
the filter housing is divided into an upper gas-tight collecting space and a lower gas-tight portion by a separating tray;
the product gas line opens into the lower gas-tight portion; and the clean gas is discharged via the clean gas line from the upper gas-tight collecting space;
at least two filter cartridges are arranged on the separating tray so that they protrude into the lower gas-tight portion, wherein each filter cartridge is individually connectable to a compressed air source by means of compressed air lines; and
a zeolite container connected to the lower gas-tight portion of the filter via a Venturi nozzle and a closeable gas line connecting the Venturi nozzle to the lower gas-tight portion of the filter, wherein the Venturi nozzle is connected to the compressed air source via a Venturi nozzle compressed air line;
wherein the product gas filter is configured so that
a filter cake formed on any of the at least two filter cartridges can be dislodged by connecting that filter cartridge to its respective compressed air source; and
selectively opening the closeable gas line connecting the Venturi nozzle to the lower gas-tight portion of the filter applies zeolite from the zeolite container to the at least two filter cartridges can form one or more new filter cakes capable of reducing long-chain hydrocarbon content in the product gas from the wood gas reactor.

2. The product gas filter of claim 1, wherein a lowermost portion of the lower gas-tight portion of the filter housing has a tapered cross section and opens into a dust container.

3. The product gas filter of claim 1, wherein the Venturi nozzle compressed air line leading from the Venturi nozzle compressed air line leading from the compressed air source to the Venturi nozzle includes a first shut-off device disposed between the compressed air source and the Venturi nozzle, and the closeable gas line leading from the Venturi nozzle to the lower gas-tight portion of the filter housing includes a second shut-off device disposed between the Venturi nozzle and the lower gas-tight portion of the filter housing.

4. The product gas filter of claim 1, wherein each compressed air line connecting the compressed air source to one of the at least two filter cartridges includes a corresponding shut-off device.

5. The product gas filter of claim 1, wherein the clean gas line further includes a fan that is configured to direct clean gas away from the product gas filter.

6. The product gas filter of claim 1, wherein the product gas line is connected by means of at least one data line with a control device or a regulating device.

7. The product gas filter of claim 1, wherein the lower gas-tight portion of the filter housing further includes one or more pressure gauges and/or flow meters that are connected by means of at least one data line with a control device or a regulating device.

8. The product gas filter of claim 1, wherein the upper gas-tight collecting space further includes one or more pressure gauges and/or flow meters that are connected by means of at least one data line with a control device or a regulating device.

9. The product gas filter of claim 1, wherein the clean gas line further includes one or more pressure gauges and/or flow meters that are connected by means of at least one data line with a control device or a regulating device.

10. The product gas filter of claim 1, wherein each filter cartridge has an associated set of pressure gauges and/or flow meters.

11. The product gas filter of claim 3, wherein the Venturi nozzle compressed air line leading from the compressed air source to the Venturi nozzle includes the first shut-off device disposed between the compressed air source and the Venturi nozzle, and the closeable gas line leading from the Venturi nozzle to the lower gas-tight portion of the filter housing includes the second shut-off device disposed between the Venturi nozzle and the lower gas-tight portion of the filter housing; and
each compressed air line connecting each filter cartridge of the at least two filter cartridges to the compressed air source includes a corresponding shut-off device;
wherein each of the first shut-off device, the second shut-off device, and the corresponding shut-off devices is in operative connection with a control device or a regulating device.

12. A method of operating a product gas filter according to claim 1, comprising:
detecting an increased pressure drop at one of the filter cartridges;
directing compressed air to the filter cartridge exhibiting the increased pressure drop via its respective compressed air line; and
injecting zeolite powder from the zeolite container into the lower gas-tight portion of the filter housing via the Venturi nozzle using the compressed air source by selectively opening the closeable gas line.

13. The method of claim 12, wherein detecting an increased pressure drop at one of the filter cartridges includes detecting the increased pressure drop at one of the filter cartridges with one or more pressure gauges and/or flowmeters.

14. The method of claim 12, wherein the steps of the method are carried out by a control device or a regulating device.

* * * * *